June 24, 1930.  J. C. MOCK  1,765,689
LIGHT SIGNAL AND PROJECTOR
Filed May 21, 1928  3 Sheets-Sheet 3

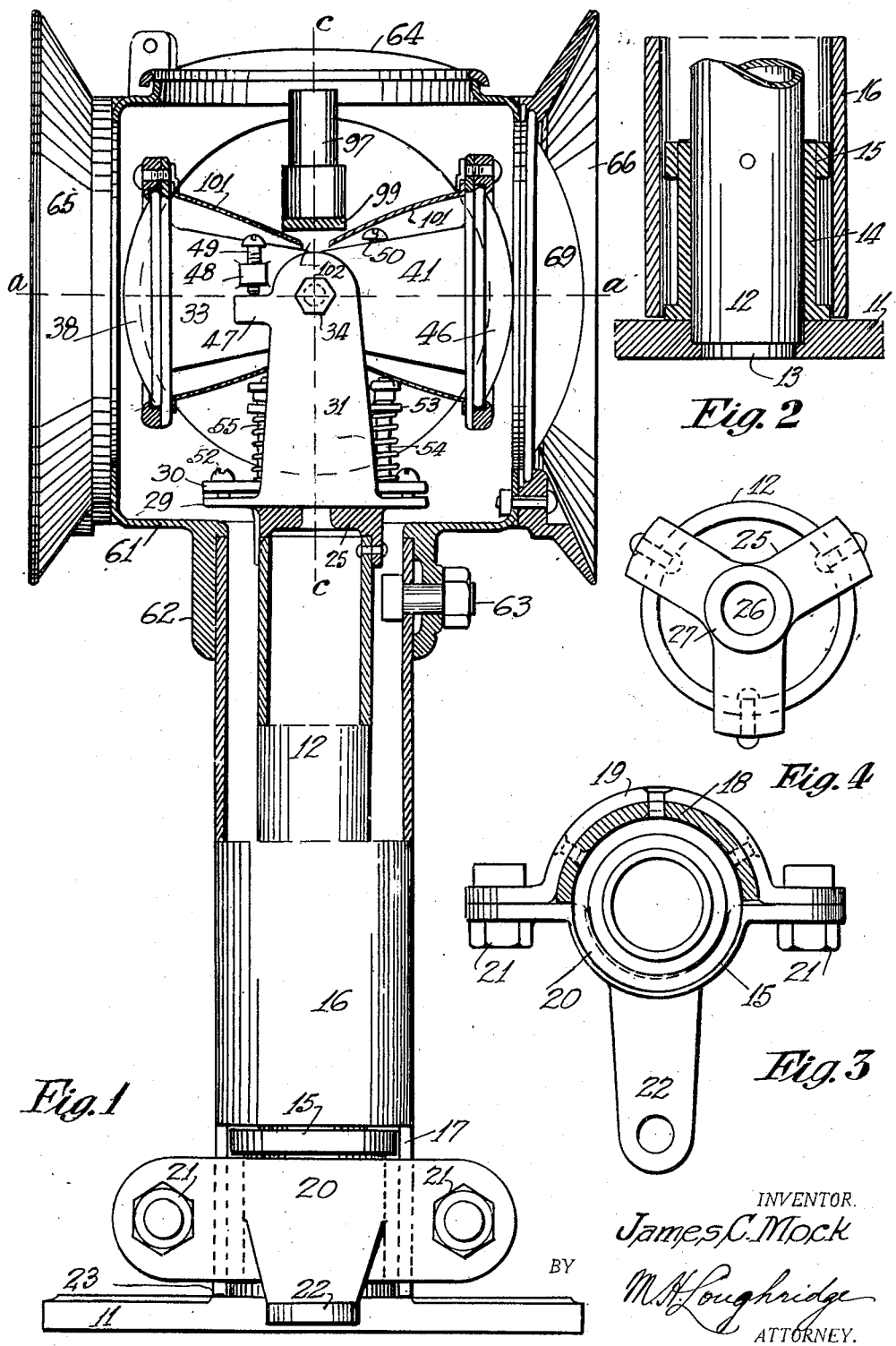

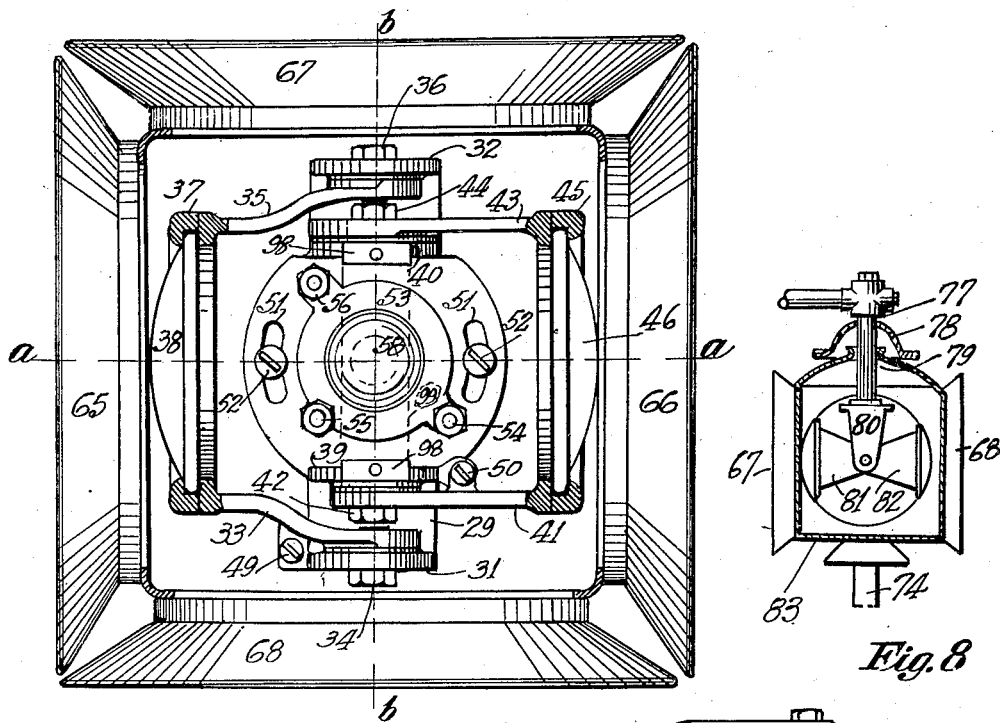
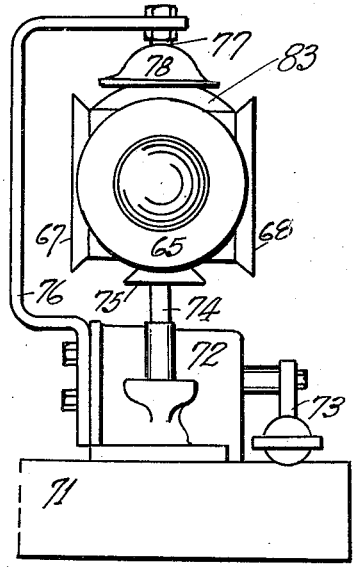
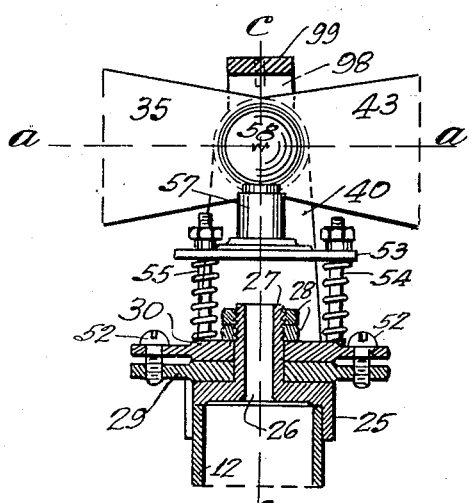

INVENTOR.
James C. Mock,
BY M. H. Loughridge
ATTORNEY.

Patented June 24, 1930

1,765,689

UNITED STATES PATENT OFFICE

JAMES C. MOCK, OF DETROIT, MICHIGAN

LIGHT SIGNAL AND PROJECTOR

Application filed May 21, 1928. Serial No. 279,536.

Figure 9:
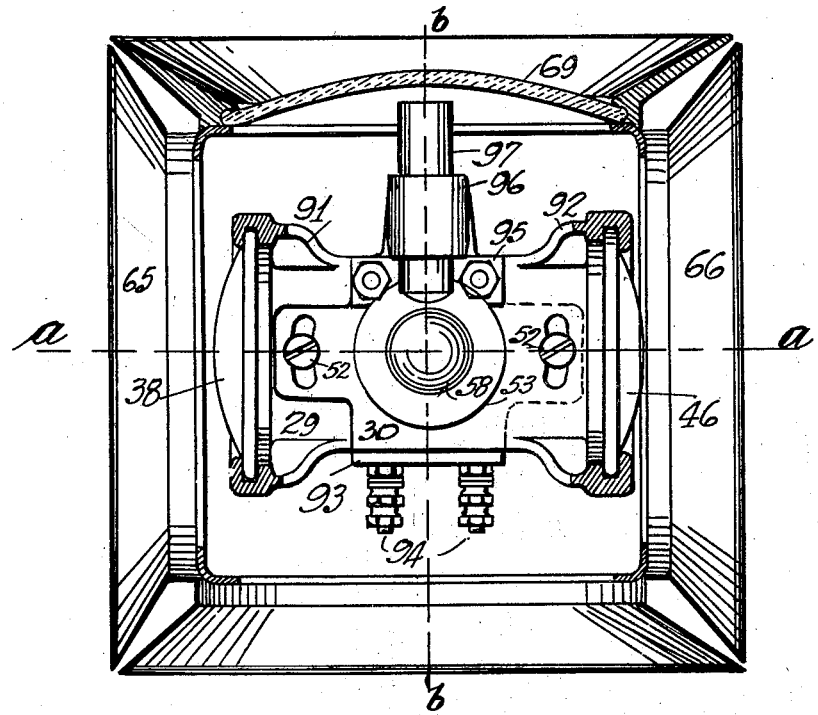
Figure 10:
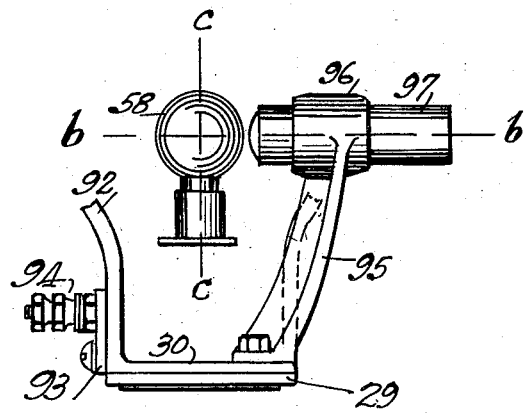

This invention relates to light signals of a type commonly used by railroads and also embodies features and improvements applying to light projectors in general. Some of its objects are to provide, a signal in which the source of illumination is stationary while the housing carrying the colored roundels is moved with respect to the stationary source of illumination to give the indication desired; a signal whose indications are changed by the mechanical movement of certain parts while the source of light remains stationary; a signal in which a stationary inner stem supports the light while a movable outer stem rotates the housing to vary the signal indication; a signal in which the housing and its support may be removed from the lamp support; a projecting device having a pair of lenses mounted for adjustment in azimuth with the source of illumination as a centre and a projecting device having a pair of lenses mounted for adjustment horizontally through an angle with the source of illumination as a centre. Other objects of the invention will appear from the detailed description in the following specification and illustrated in the accompanying drawings, in which, Fig. 1 is an elevation of a signal device shown partly in section, embodying my invention, Fig. 2 is a sectional detail of the base of the signal device, Fig. 3 is a plan view of the operating crank with the outer stem sectioned, Fig. 4 is a detail of the spider supporting the optical arrangement, Fig. 5 is a plan view of the mechanism housing with the top removed, Fig. 6 is a sectional elevation showing the construction at the head of the inner stem, Fig. 7 shows one form of railway switch target to which my invention is applied, Fig. 8 is an arrangement corresponding to Fig. 7 with the housing sectioned to show the interior construction, Fig. 9 is a modified signal with the housing partly sectioned embodying my invention and Fig. 10 shows the details of a focusing device, used with Fig. 9.

Signals giving their indication by the display of a beam of colored light are in common use on railways. A popular signal of this type moves a colored roundel in front of the projecting lens to give the indication required. Dwarf signals of this type are used which are mechanically connected by a pipe line with a switch stand or the switch point rails, the signal changing its indication by rotating through 90° to bring a different face of the signal into view. Signals of the latter type are, in practice, subject to a great deal of vibration and jar in their ordinary operation and one of the purposes of this invention is to eliminate this vibration and to provide a stationary mounting for the light source and lenses so that these signals may be electrically lighted without subjecting the light bulb to vibration and without twisting the conductors connected to this light bulb. One construction used to secure this result shown in the drawings comprises a stationary inner stem upon which the lamp bulb and projecting lenses are mounted while an outer stem, free to rotate about the inner stem, carries the housing and the colored roundels so that the outer shell is rotated about the stationary light to give the indication desired.

Light signals of the type referred to, when applied to turn out switches, usually give indications in opposite directions and it is desirable to be able to adjust these indications horizontally so that they can be directed in the line of deflecting track. To secure this end a pair of brackets are supported on a vertical pivot on the inner stem and are rotatable on this pivot. These brackets carry the projecting lenses so that these lenses can be adjustably positioned horizontally to direct the beam of light as desired.

Light signals of the dwarf type are usually located close to the ground and it is desirable to project the light beam from them with an upward inclination so that they may be more readily seen. For this purpose the positions of the projecting lenses are adjustable in azimuth to the angles desired.

The light bulb is, preferably, of the concentrated filament type so that the light is concentrated in a point and the greatest efficiency is obtained when this point corresponds with the foci of the projecting lenses.

The bulb is mounted on an adjusting stand so that it may be located at the common focal point of the pair of lenses. The lenses are mounted on arms pivotally connected to the brackets and so arranged that this pivot point is in the horizontal plane of the focal point of the lenses, while the axis of the vertical pivot of the brackets passes through the focal point in the vertical plane. This enables the adjustments in the horizontal and the adjustments in azimuth of the lenses to be made without disturbing the focal adjustment already established. A sighting device may be used to locate the filament preferably carried by the lens support and bearing upon the foci of the lenses.

Referring to the drawings, 11 is the base of the signal which is secured to a suitable foundation, 12 is the inner tubular stem which is suitably fastened to the base and an aperture at 13 in the base enables the electric conductors to be led into the inner stem. The stem 12 is supported by the sleeve 14 which is rigidly secured to or integral with the base and which is provided with a collar 15. The outer stem 16 is tubular in formation and rests upon the base 11 at 23 and is free to rotate on the base.

The stem 16 opposite sleeve 14 is cut away to a half cylinder as indicated at 17, Fig. 1. The semi-circular clamping strap 19 is secured to this half cylinder as indicated at 18, Fig. 3 and the crank member 20 is secured to 19 by the bolts 21. The crank member is formed in a semi-circle of a radius which fits the sleeve 14 below the collar 15 so that this member engages the collar and prevents the outer stem from being raised when the crank is in place. The operating rod is connected to the crank 22 formed integral with 20 and through the movement of this crank and the strap 19, the outer stem is rotated in accordance with the crank movement. By removing the crank and optical apparatus the outer stem and housing can be lifted over the inner stem.

The top of the inner stem 12 is provided with a spider 25 as shown in Figs. 4 and 6. This spider has a stem 27 centered on the axis of the tube and provided with an aperture 26 through which the conductors may be passed. This stem is threaded on its upper end to receive the nuts 28 which clamp the brackets 29 and 30 supporting the optical apparatus to the spider 25; these brackets are thus pivotally mounted on the axis of tube 12, that is on the vertical centre of the signal.

The bracket 29 is provided with the diametrically opposed upstanding arms 31 and 32. The horizontal arm 33 is pivoted to 31 at 34 and the opposing arm 35 is pivoted to 32 and 36. The arms 33 and 35 support the lens ring 37 carrying the lens 38. A similar construction is provided on bracket 30 having the vertical arm 39 and the horizontal arm 41 pivoted to it at 42 and the opposite arm 43 pivoted to the vertical arm 40 at 44. The arms 41—43 carry the lens ring 45 supporting the lens 46. The vertical position of lens 38 is adjusted on the pivots 34—36 by the screw 49 in the projection 48 on arm 33, engaging the stop 47 formed integral with 31. The screw 50 correspondingly adjusts the vertical position of lens 46.

The intersection of the lines a—a; b—b; and c—c is the focal point of the lenses 38 and 46; these lenses being adjusted in their mountings by gaskets so that their focal point is accurately located at the intersection of these lines. It will be noted that the pivots 34, 36, 42 and 44 fall on the line b—b and that the brackets 29—30 rotate about the line c—c. The upper bracket 30 may be provided with slots 51 through which it may be secured to the lower bracket by the screws 52; these brackets are also clamped by the nuts 28 to the stem 27 to lock them in position after they have been adjusted. It is apparent that the lenses 38—46 may be rotated through a vertical angle and they may also be rotated horizontally on pivot 27 without changing their focal point from the intersection of lines a—a, b—b and c—c; thus the light beams projected from these lenses may be deflected as desired without disturbing the foci of the lenses.

The light bulb 58 is adjustably supported by a supporting bracket constructed similarly to that shown in U. S. Patent 1,535,218 issued April 28, 1925. The socket 57 is secured to the bracket 53 which is mounted on three posts 54, 55 and 56 and is adjusted by the nuts against the springs on these posts. This adjustment enables the filament of the lamp bulb to be located with accuracy at the intersection of lines a—a, b—b and c—c, that is, at the focal point of the projecting lenses 38—46. For the purpose of readily locating the bulb filament at the focal point, the sighting device 97 may be used for this purpose. This comprises a sighting tube similar to that shown in application for U. S. Patent Serial No. 174,365, filed March 10, 1927. The inner vertical arms 39—40 terminate in horizontal pads 98, Fig. 5, which support the bridge piece 99, carrying the sighting tube 97. This bridge piece is located accurately by dowels on 99 so as to centre the sighting tube on line c—c whereby the position of the filament may be adjusted to the focal point of the lenses 38—46. The bridge piece is removable as its use is necessary only when adjusting the position of the filaments.

The housing 61 is formed with a socket 62 which is secured at 63 to the outer stem 16 and rotates with this stem. The housing is provided with a cover 64 and with targets 65, 66, 67 and 68 on the four sides of the housing. Each target is provided with a colored roundel 69 which may be a flat or curved disc of glass located opposite the projecting lens. It is apparent that when the stem is rotated through 90° a new set of colored roundels are brought opposite the lenses and a new indication is therefore displayed.

In the signal described the stationary support for the light passes through the stem supporting the housing. In other types it may be necessary to bring the stationary support into the housing at some other point, as for instance through the top of the housing. A construction of this kind is shown in Figs. 7 and 8 in which my invention is adapted to existing switch targets. The switch stand 72 is supported on the tie 71 and is operated by the weighted lever 73 which rotates the supporting stem 74 as well as operating the throw rod of the switch. The switch lamp 83 is supported by the stem 74 in the socket 75 and is rotated as the lever 73 is operated. The support 76 is bolted to the switch stand and has depending from it on the vertical line of the supporting stem 74, the stem 77 and the bell 78. This stem carries the bracket 80 with the lens supporting arms 81—82 in front of the roundels thus making a fixed support for the light bulb and lenses in the housing 83 which is rotated by the stem 74 producing results corresponding to Fig. 1. A parabolic reflector may be provided for the lenses as indicated at 101 Fig. 1, the space 102 between the reflectors being wide enough to permit adjustment of the horizontal arms.

The signal in Fig. 9 provides for the horizontal adjustment of the lenses only and has the sighting tube located horizontally on the line b—b. The bracket plate 30 has secured thereto the terminal board 93 with the binding posts 94 for the electrical connections, also the bracket 95 having the socket 96 supporting the sighting tube 97 on line b—b. This tube thus rotates with plate 30 but always bears upon the focal point of the lenses. This plate through frame 92 carries lens 46 and the plate 29 through frame 91 carries the opposing lens 38. The sight of the lamp filament can be seen through the roundel 69 from the outside.

The structure described provides a light signal in which the source of light and the lenses are stationary while the indications are changed by rotating the housing of the signal, also it provides an optical system in which lenses are adjusted with relation to a fixed source of light in azimuth and in the horizontal without changing their focal relation to the light source. It should be understood that variations in the construction shown may be made without affecting the essential features of the invention.

Having thus described my invention, I claim:

1. In a signal as described, the combination, a stationary support, a source of light and a plurality of projecting lenses carried by said support, a housing for said source and lenses, said housing having colored roundels aligning with said lenses and means for rotating said housing.

2. In a signal as described, the combination, a stationary support, a source of light and a projecting lens carried by said support, a housing for said source and lens, said housing having roundels aligning with said lens and angularly disposed ninety degrees from each other and means for rotating said housing about said light source as a centre.

3. In a signal as described, the combination, a central fixed stem supporting a lamp bulb, a housing for said stem having roundels aligning with said bulb, a tubular support for said housing enclosing said fixed stem, means on said fixed stem for holding said tubular support in place and a crank secured to said tubular support for rotating said housing.

4. In a signal as described, the combination, a central fixed stem supporting a lamp bulb, a housing for said stem having roundels aligning with said bulb, a tubular support for said housing substantially enclosing said fixed stem, a crank secured to said tubular support for rotating said housing and a collar on said fixed stem engaged by said crank.

5. In a signal as described, the combination, a central fixed stem supporting a lamp bulb, a housing for said stem having roundels aligning with said bulb, a support for said housing, a crank secured to said support for rotating said housing and means co-operatively engaging said crank with said fixed stem to hold said housing in place.

6. In a signal as described, the combination, a central fixed stem supporting a lamp bulb, a housing for said stem having roundels aligning with said bulb, a tubular support for said housing enclosing said fixed stem and having an aperture therein to expose part of said fixed stem, a collar on said fixed stem opposite the aperture in said tubular support and an operating crank secured to said tubular support and engaging said collar.

7. In a signal as described, the combination, a central fixed stem terminating in an axial pivot, a bracket pivotally secured to said stem supporting a lens and a lamp bulb, a housing for said bulb free from said stem and having roundels aligning with said lens and means for rotatably supporting said housing.

8. In a signal, as described, the combination, a central fixed stem terminating in an axial pivot, a plurality of brackets pivotally secured to said stem, a lamp bulb supported by said stem, a housing for said bulb free from said stem and having roundels aligning with said brackets and means for rotatably supporting said housing.

9. In a signal as described, the combination, a central fixed stem terminating in an axial pivot, a plurality of pairs of brackets pivotally secured to said stem, a lens pivotally secured to each pair of brackets and a source of illumination located at the focal point of said lenses.

10. In a projecting device, the combination, a fixed vertical pivot, a plurality of brackets pivotally secured to said vertical pivot, horizontal arms pivotally secured to each of said brackets, and a lens supported by each pair of said arms, said lenses having a common focal point.

11. In a projecting device, the combination, a fixed vertical pivot, a plurality of brackets pivotally secured to said vertical pivot, a lens pivotally mounted on each of said brackets adjustable in azimuth, each of said lenses having a common focal point.

12. In a projecting device, the combination, a fixed vertical pivot, a plurality of brackets pivotally secured to said vertical pivot, means for clamping said brackets in position, a lens pivotally mounted on each of said brackets and means for adjusting said lenses in azimuth.

13. In a projecting device, a plurality of lenses having a common focal point, means for adjusting said lenses horizontally about said focal point and means for adjusting said lenses in azimuth about said focal point.

14. In a projecting device, a plurality of lenses having a common focal point and means for adjusting each of said lenses independently in azimuth about said focal point.

15. In a projecting device, a plurality of lenses having a common focal point and pivoted members supporting each of said lenses, said pivots being located in the plane of said focal point.

16. In a projecting device, the combination, a plurality of lenses having a common focal point, a pivoted member supporting each of said lenses, said pivot being located in the plane of said focal point and a source of illumination located at said focal point.

17. In a projecting device, the combination, a vertical pivot having a hollow stem, a bracket rotatably mounted on said stem, a lens mounted on said bracket having its focal point on the axial line of said pivot, a lamp bulb having its filament located at said focal point and electrical conductors for said bulb led through the hollow stem of said pivot.

18. In a projecting device, the combination, a fixed vertical pivot, a plurality of brackets mounted on said vertical pivot, a lens and a reflector mounted on each of said brackets, said lenses having a common focal point and a source of illumination located at said focal point.

19. In a projecting device, the combination, a vertical pivot, a plurality of brackets rotatably mounted on said pivot, a lens mounted on each of said brackets adjustable in azimuth, said lenses having a common focal point and being adjustable independently of each other.

20. A mounting for a plurality of projecting lenses having a common focal point comprising means for rotating said lenses about said common focal point and means for independently adjusting said lenses in azimuth.

In testimony whereof I affix my signature.

JAMES C. MOCK.